March 13, 1956  G. OLAH  2,737,964
PNEUMATIC CONTROL APPARATUS
Filed May 2, 1950  6 Sheets-Sheet 1

George Olah
By Mock & Blum
ATTORNEYS

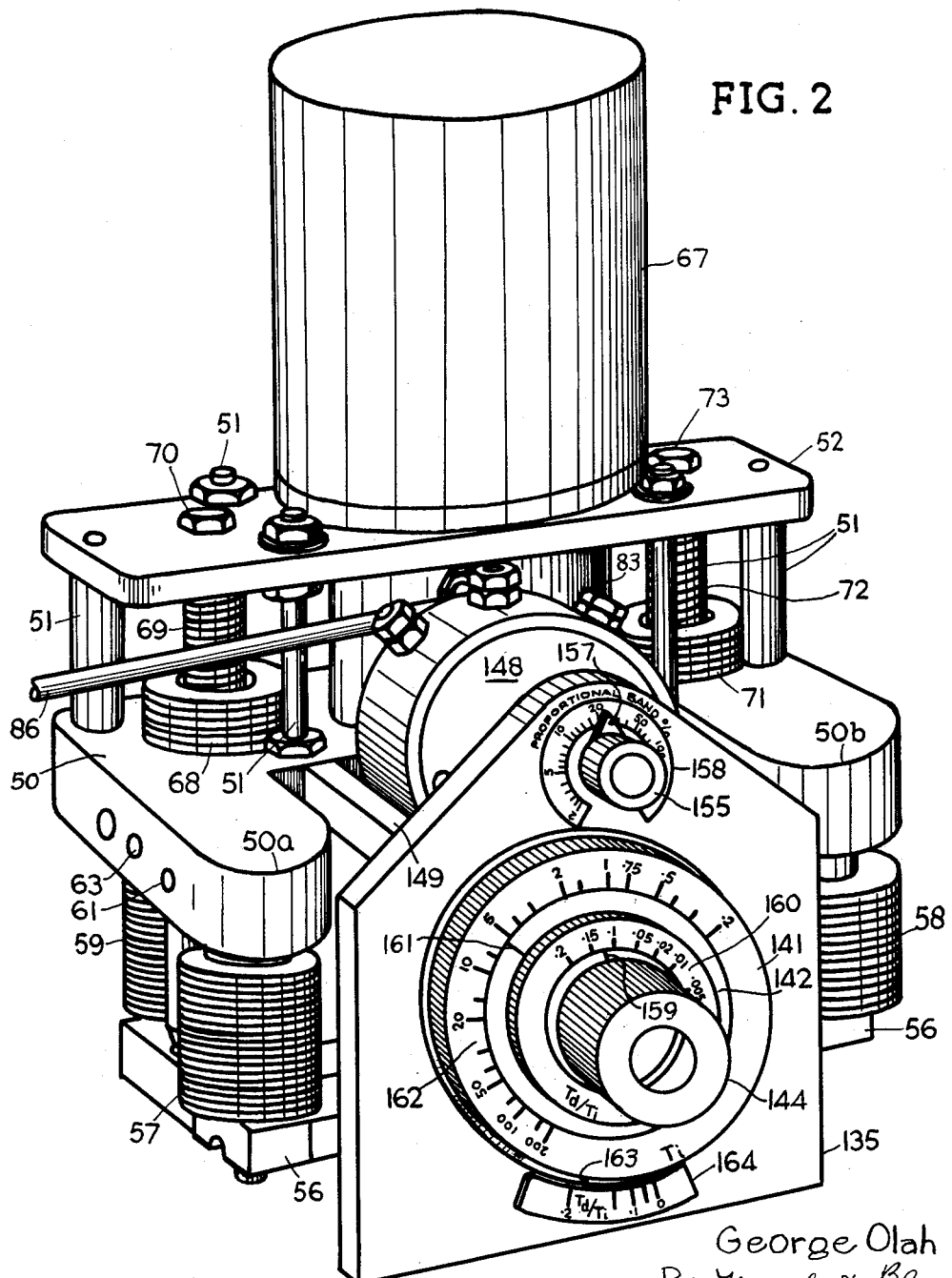

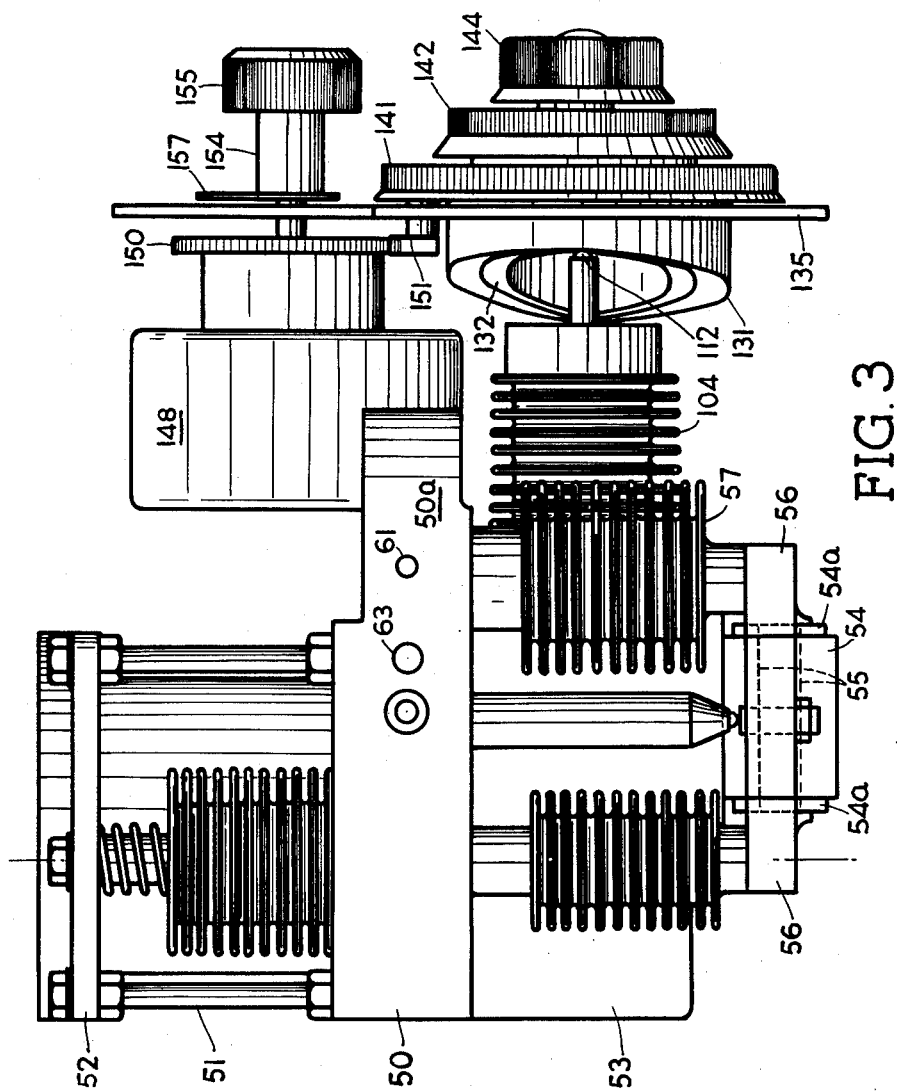

March 13, 1956

G. OLAH 2,737,964

PNEUMATIC CONTROL APPARATUS

Filed May 2, 1950

George Olah
By Nock & Blum
ATTORNEYS

March 13, 1956   G. OLAH   2,737,964
PNEUMATIC CONTROL APPARATUS
Filed May 2, 1950   6 Sheets-Sheet 5

George Olah
By Nock & Blum
ATTORNEYS

George Olah
By Mock & Blum
ATTORNEYS

United States Patent Office 2,737,964
Patented Mar. 13, 1956

2,737,964

PNEUMATIC CONTROL APPARATUS

George Olah, London, England, assignor to Precision Developments Company Limited, London, England, a company of Great Britain Application May 2, 1950, Serial No. 159,480

Claims priority, application Great Britain May 3, 1949

8 Claims. (Cl. 137—86)

This invention relates to pneumatic control apparatus of that character which when supplied, for example from a measuring or like element, with an incoming signal proportional to the extent to which the value of a variable of a quantity or process to be controlled has deviated from a required value will yield a pneumatic outgoing signal (for utilisation in a pneumatically operated regulating element adapted to restore the variable to the required value) composed of three components respectively proportional to the magnitude, time derivative and time integral of the incoming signal. Pneumatic control apparatus of this character is commonly referred to as a "three-term pneumatic controller" and will be so designated throughout the following description and in the appended claims.

Some examples of known forms of such three-term pneumatic controllers are briefly described in the following paragraphs.

In a first example, a variable mechanical linkage with a regulatable mechanical advantage ($a$) connects a measuring displacement element (for example a Bourdon tube) with a pneumatic pressure regulating element ($b$) consisting for example of a nozzle and flapper, and a time derivative bellows ($c$) is fed through a regulatable pneumatic resistance ($d$) from the pressure regulating element ($b$). The time derivative bellows, which has a capacity $C$ and may, in some cases, be connected with an additional air vessel ($e$), as a capacitance element, to give a total capacity $C_1$, is connected through a further pneumatic resistance ($f$) with a time integral bellows ($g$), which has a capacity $G$ and may be connected with an additional capacitance element ($h$) giving a total capacity $G_1$, a differential feed back linkage ($j$) serving to connect the bellows ($c$) and ($g$) with the linkage ($a$).

In another arrangement, the incoming signal is a pressure (or pressure differential) created by a pressure converter ($k$) disposed between the measuring element and the controller and having means ($k_1$) to regulate the ratio between the pressure and the measured quantity, the signal acting on a signal bellows ($m$), or on the bellows of a pair ($m_1$ and $m_2$), as the case may be. The remainder of the mechanism is substantially as set forth in the preceding paragraph except that the signal bellows ($m$ or $m_1$ and $m_2$), the time derivative bellows ($c$), the time integral bellows ($g$) and the nozzle ($b$) act on the beam of a pneumatic balance, which beam is functionally equivalent to the differential feed-back linkage of the preceding paragraph.

In a preferred variant of this arrangement, the pneumatic pressure is converted by means of a flexible membrane or the like into pressure of a liquid which passes through hydraulic resistances equivalent to and replacing the pneumatic resistances ($d$) and ($f$) into a liquid-filled bellows system replacing the bellows ($c$) and ($g$) previously described and in which the air vessel capacitances ($e$) and ($h$) are replaced by equivalent spring-loaded liquid-filled bellows. This variant has the advantage that the small cross-sections which must be employed in establishing pneumatic resistances and which are inconvenient from a manufacturing and operational point of view can be replaced by the very much larger cross-sections required for hydraulic resistances due to the much higher viscosity of the operating fluid.

The functional relationship between the incoming and outgoing signals in these three-term pneumatic controllers may be expressed as:

$$U = \frac{U_{max}}{K/100 M_{max}} \left( \frac{1}{T_i} \int M \, dt + M + T_d \frac{dM}{dt} \right)$$

where $U$=Outgoing signal, expressed as pneumatic pressure difference.
$U_{max}$=Range of outgoing signal.
$M$=Incoming signal.
$M_{max}$=Range of incoming signal.
$K$=Proportional band expressed as percentage of the range of incoming signal.
$t$=Time.
$T_i$=Integral time constant.
$T_d$=Derivative time constant.

Given a measuring element with a range $M_{max}$ and a regulating element with a range $U_{max}$, the constants $K$, $T_i$ and $T_d$ determine the nature of the control action. Instead of the derivative time constant $T_d$, however, it is convenient to take as the third constant the ratio $$n = \frac{T_d}{T_i}$$

In all these known arrangements, the three characteristic constants, that is, proportional band $K$, integral time constant $T_i$ and derivative time constant $T_d$, are set up in the controller by the following operations:

1. Setting of the mechanical advantage of linkage ($a$) or the equivalent setting of the regulating means ($k_1$).
2. Setting of the pneumatic resistance ($d$) or the equivalent hydraulic resistance and/or varying the capacity of the air vessel ($e$) or the loading on the equivalent spring-loaded bellows. The product of the resistance ($d$) and the capacity $C$ (or $C_1$) yields an auxiliary time constant $T_1$.
3. Setting of the pneumatic resistance ($f$) or the equivalent hydraulic resistance and/or varying the capacity of the air vessel ($h$) or the loading on the equivalent spring-loaded bellows. The product of the resistance ($f$) and the capacity $G$ (or $G_1$) yields an auxiliary time constant $T_2$.

These three settings do not give the three characteristic constants of the control directly but interact between each other in a complicated fashion, the interaction being also dependent on individual design features of the apparatus.

An important object of the present invention is to provide an improved arrangement in a three-term pneumatic controller whereby the setting dial readings may indicate directly the values of the three characteristic constants for the control action. A further object of the invention is to provide automatic temperature compensation in those cases where a viscous liquid is employed as the working medium and has to flow through hydraulic resistances.

The mathematical basis of this invention may be briefly indicated as follows:

It has been found that for any construction of three-term pneumatic controller such as indicated above, the ratio of the auxiliary time constant $T_1$ (which is proportional to the resistance ($d$)) to the auxiliary time constant $T_2$ (which is proportional to the resistance ($f$)) is a function of the ratio of the derivative time constant and the integral time constant only, that is to say (1) $$\frac{T_1}{T_2} = f\left(\frac{T_d}{T_i}\right) = f(n)$$

Furthermore, it has also been found that if the derivative time $T_d$ is zero, then correspondingly $T_1$ is zero and the proportional band setting $K_0$ is proportional to the incoming signal attenuation and not dependent on the integral time. If the derivative time is not zero, then the proportional band K is found to be (2) $$K = K_0 \phi(n)$$

wherein $\phi$ is again a function of $(n)$ only.

Furthermore, it has been found that the auxiliary time constant $T_2$ can be expressed as (3) $$T_2 = T_i \phi(n)$$

or (3a) $$T_i = \frac{T_2}{\phi(n)}$$

wherein $\phi$ is the same function of $(n)$ as in Equation 2.

Furthermore, from Equations 1 and 3 the derivative time constant may be expressed as (4) $$T_d = T_i n = \frac{T_2 n}{\phi(n)} = T_2 \phi(n)$$

According to this invention, in a three-term pneumatic controller, the respective regulatable fluid resistances (which have been desginated $(d)$ and $(f)$ in the foregoing discussion) are each constituted by a passage through a valve of the logarithmic type, i. e. one in which a given regulating adjustment of the movable element of the valve always produces the same change in the ratio between the resistances of the passage before and after the adjustment irrespective of the initial position from which the adjustment was made, and indicating means calibrated in values of $$\frac{T_d}{T_i}$$

is provided to indicate the differential displacement between the movable elements of the two valves.

Similarly, the means for attenuating or amplifying the incoming signal, i. e. the means for regulating the ratio between the proportional pneumatic pressure and the measured quantity, are logarithmically arranged that is, if the control element for operating such means is displaced or rotated by a predetermined amount, the attenuation will always change in the same ratio, this attenuation being a measure of the proportional band.

The valves for setting the time constants $T_1$ and $T_2$ may be so arranged that their movable elements are adjusted by rotating two face cams, the same change in the position of the valves creating the same resistance ratios for both valves. The means for separately adjusting the two valves are arranged so that they may be mechanically coupled or temporarily uncoupled. If both means are coupled in a certain relative position to each other, adjusting both valves simultaneously produces the same ratio change in $T_1$ and $T_2$ and consequently the ratio $$\frac{T_1}{T_2}$$

remains constant so that according to Equation 1, $(n)$ also remains constant. If the two adjusting means are uncoupled and the one is moved relative to the other, the ratio of $T_1$ to $T_2$ and hence the value of $n$ change, the extent of the change being determined by the displacement of the one valve relative to the other.

In accordance with another feature of this invention, a dial is provided on the movable element of one of the valve members, or on the operating mechanism therefor, and a corresponding index is mounted on the movable element of the other valve member, or on the operating mechanism therefor, to co-operate with the dial which latter is thus capable of indicating directly the value of $n$ which is one of the control characteristics.

Various other features of the invention and details of construction will appear from the following description taken with reference to the accompanying drawings, wherein:

Fig. 2 is a front perspective view of a practical construction of the main portion of a controller such as is illustrated diagrammatically in Fig. 1 but modified by the incorporation of the features of the present invention thereinto;

Fig. 3 is a side elevation of the apparatus shown in Fig. 2 with the pressure converter removed, the view being taken from the left of Fig. 2;

Figure 1:
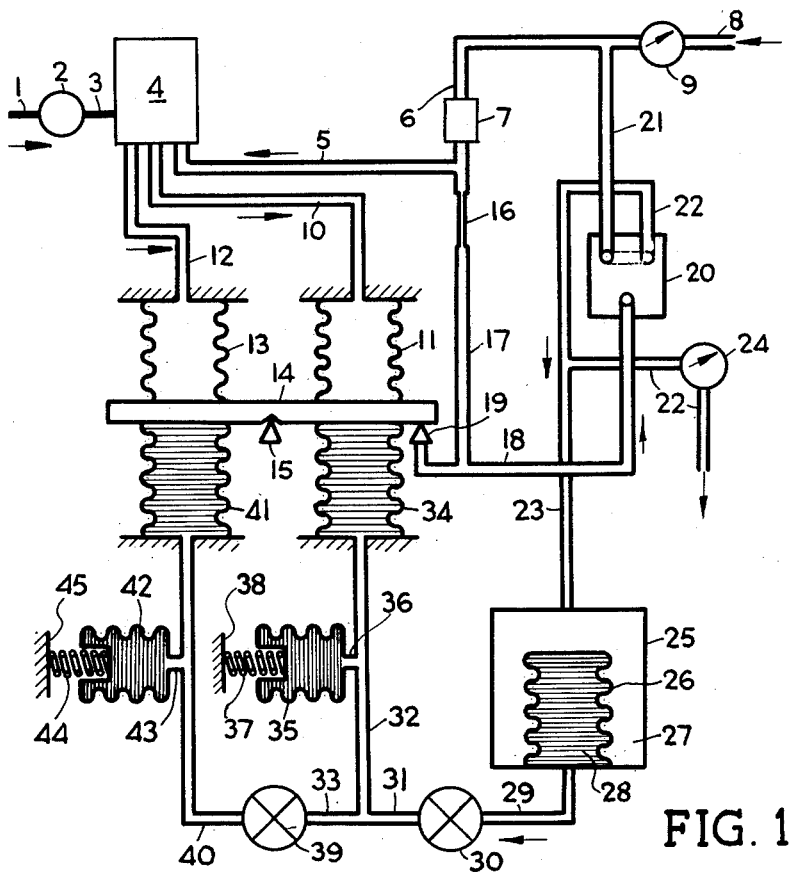
Fig. 1 is a diagrammatic representation of the elements of a three-term pneumatic controller which has been selected as a representative example of the known arrangements, showing the pneumatic and hydraulic circuits which are utilised.

Referring firstly to Fig. 1, the known arrangement diagrammatically illustrated comprises an electric lead 1 through which an electric signal is transmitted from a measuring instrument adapted to respond to a deviation from a desired value of a variable of a process to be controlled, the magnitude of the signal being proportional to the degree of deviation. The lead 1 is connected to an attenuating device, composed of a potentiometer shown at 2, which is adapted to be set in order to determine the ratio between the signal passed on thereby and the actual deviation measured by the measuring instrument, i. e. to determine the proportional band of the controller. The signal output from the attenuating device is conveyed by an electric lead 3 into an electro-pneumatic converter 4, the function of this apparatus being to produce a pneumatic pressure differential proportional to the electric signal fed into the same at 3. The main pressure supply to the converter is by way of the pipe 5 which is branched from a pipe 6 in the length of which is located a filter element 7. The pipe 6 is supplied at 8 with a gaseous fluid under a predetermined pressure which is held substantially constant, for example, at any selected value between say 3 and 20 lbs. per square inch. The pressure of the gaseous fluid supplied at 8 may be indicated on a pressure gauge shown at 9. One of the two pressures constituting the output from the converter is conveyed through a pipe 10 to the interior of a flexible bellows 11 whereas the other of the two pressures is conveyed through a pipe 12 to the interior of a flexible bellows 13. Each bellows, 11 or 13, has its one end fixedly mounted and its other end secured to the appropriate arm of a beam 14 pivoted at 15. Upon a change in the signal received at the converter 4 the respective pressures in the bellows 11 and 13 will be varied to cause tilting of the beam 14 about its pivot 15. This tilting motion is utilised to determine the effective static pressure in a further gaseous fluid circuit which derives its supply from the output side of the filter 7 through a pneumatic resistance which is illustrated as a restricted passage 16. The further circuit comprises a pipe 17 leading from the passage 16 into a further pipe 18 having its one end fitted with a nozzle 19 disposed with its outlet directed upwardly against the underside of the one end of the beam 14 and in such close proximity thereto that variations in the position of the beam relative to the nozzle will correspondingly vary the degree of freedom with which the pressure fluid may escape from the pipe system 17, 18. Due to the provision of the restricted passage 16, therefore, the static pressure prevailing in the system 17, 18 at any time will be a function of the deflection of the beam 14 and will, hence, have a component proportional to the pressure differential supplied by the converter 4 as well as other components derived in the following manner. The static pressure prevailing in the pipe 18 is utilised in a pilot valve 20 of known construction to control the pressure at which a further stream of gaseous fluid will flow through the pilot valve, in such manner as to ensure that the output pressure of the fluid stream will always be functionally proportional to the static pressure prevailing in the pipe 18. The stream of pressure fluid which is thus controlled is derived through a pipe 21 from the pipe 6 and is supplied, after pressure-regulation, through a pipe 22 from which a branch pipe 23 leads to a transfer device by means of which the gaseous fluid pressure prevailing in the pipe 22 is converted into a proportional hydraulic pressure of a liquid. The gaseous fluid under pressure flowing through the pipe 22 is supplied to a pneumatically operated regulating device (not shown) which is thereby actuated to modify a condition or conditions in the process to be controlled in such a sense as to restore the variable of the process towards the desired value from which it has deviated. A pressure gauge 24 is preferably arranged in the pipe 22 so that the pressure prevailing in that pipe may be indicated continuously.

The transfer device referred to comprises a vessel 25 having its internal space subdivided by means of a flexible bellows 26 into a gas space 27 and a space 28 filled with a liquid such as oil. The pipe 22 opens through a wall of the vessel 25 into the gas space 27 and a pipe 29 opens through another wall of the vessel 25 into the liquid-filled space 28 within the bellows 26. It will be understood that the pressure exerted upon the oil or other liquid contained within the bellows 26 will at all times be closely proportional to the pneumatic pressure which prevails within the space 27. It will further be understood that an increase in the pneumatic pressure will cause liquid to tend to flow out from the space 28 within the bellows by way of the pipe 29. The latter leads through a regulatable hydraulic resistance, constituted by an adjustable valve, indicated diagrammatically at 30, to a pipe 31 which is connected to both a pipe 32 and a pipe 33. The pipe 32, in turn, leads to the interior of a flexible bellows 34 having its one end fixedly mounted and its other end secured to the underside of that arm of the beam 14 to which the bellows 11 is secured on the upper side. A capacitance bellows 35 has its interior placed in communication with the pipe 32 by way of a branch pipe 36, this bellows being subjected to a predetermined pressure produced by spring-loaded means 37 acting against a fixed abutment 38.

The pipe 33 leads through a second regulatable hydraulic resistance constituted by an adjustable valve, indicated diagrammatically at 39, to a pipe 40 which, in turn, leads to the interior of a flexible bellows 41 having its one end fixedly mounted and its other end secured to the underside of that arm of the beam 14 to which the bellows 13 is secured on the upper side. A capacitance bellows 42 has its interior placed in communication with the pipe 40 by way of a branch pipe 43, this bellows being spring-loaded at 44, 45 in the same manner as the bellows 35.

As has been indicated by the theoretical discussion given above, the product of the total capacity of the two bellows 34 and 35 and the pre-set resistance offered by the valve 30 yields an auxiliary time constant $T_1$ while the product of the total capacity of the two bellows 41 and 42 and the pre-set resistance offered by the valve 39 yields an auxiliary time constant $T_2$. Moreover, the ratio $$\frac{T_1}{T_2}$$

is a function of the ratio of the derivative time constant $T_d$ and the integral time constant $T_i$ only, and the time constants $T_1$ and $T_2$ are in practice determined by the settings of the valves 30 and 39, respectively.

Consequently, the pressure which builds up in the bellows 34, at a rate determined by a correct setting of the constant $T_1$, ensures that the static pressure in the pipe 18 will contain (in addition to the component already referred to above) a component proportional to the derivative time constant of the input signal, whereas the pressure which builds up in the bellows 41, at a rate determined by a correct setting of the constant $T_2$, ensures that the static pressure in the pipe 18 will also contain a component inversely proportional to the integral time constant of the input signal.

These three-term controllers are known and further description of the operation of the example given is therefore thought to be unnecessary.

As has been mentioned in the foregoing, the setting up of these known controllers is largely a matter of trial and correction of error because it is not possible with them to adjust the setting controls directly to the respective values of the characteristic constants of the desired control action, these constants, of course, being capable of calculation, by mathematical analysis or from experimental data. Consequently, the determination of the values of the constants for which the controller is set involves computation and an exact knowledge of the several operating constants of the apparatus and the manner in which a change in each of these reacts upon each of the others.

This difficulty is overcome by the means of the present invention which make it possible so to calibrate the setting dials that the respective values of the characteristic constants for which the controller is set, or to be set, are directly indicated.

In accordance with the invention, as applied to the controller shown in Fig. 1, the valves 30 and 39 are each constructed as a logarithmic valve wherein the displacement or rotation of a movable controlling element varies the resistance offered to the passage of a liquid through the valve and wherein the ratio between the resistances offered before and after a given displacement or rotation of the controlling element is always the same irrespective of the initial position from which the displacement or rotation was effected. In addition, means (not indicated in the diagram of Fig. 1) is provided in association with the two logarithmic valves whereby the differential adjustment of the controlling elements of these valves may be indicated directly, this indicating means being calibrated in values of the ratio of the derivative time constant ($T_d$) of the signal supplied at 1 to the integral time constant ($T_i$) of this signal. It will be understood, from the discussion of the mathematical basis of this invention, that adjustment of the valve 30 will vary the setting of the auxiliary time constant $T_1$ while adjustment of the valve 39 will vary the setting of the auxiliary time constant $T_2$. The means for separately adjusting the two valves are arranged so that they may be rigidly coupled together for actuation in unison after they have been set in relation to each other, with the aid of the indicating means calibrated in values of $$\frac{T_d}{T_i}$$

in order to determine the required ratio of the auxiliary time constants $$\frac{T_1}{T_2}$$

and hence of the value of $n$. When so coupled together simultaneous adjustment of the valves does not affect this value of $n$ because the same ratio changes in the resistances offered by the two valves are thereby produced. Conveniently, the indicating means referred to comprises a dial secured to the actuating means for the one valve (that determining $T_2$) and a co-operating index secured to the actuating means for the other valve, the dial being calibrated in values of $n$ which is one of the control characteristics.

The dial secured to the means for adjusting the valve 39 (i. e. for determining the auxiliary time constant $T_2$) is provided with an index to co-operate with a further dial calibrated in units of time and further provision is also made, as hereinafter more fully described, whereby the integral time may be read directly whether the derivative time be zero or not. In addition, because a change in the setting for the derivative time constant requires a corresponding change in the proportional band setting, means is provided whereby the potentiometer 2 is automatically adjusted as required, all as hereinafter more fully described.

Referring now to Figs. 2 to 8, it will be seen that a convenient practical construction of a three-term pneumatic controller, adapted to function on the basis already described with relation to Fig. 1 but embodying the means of the present invention comprises a compact assembly of the several bellows (marked 11, 13, 34, 41, 35, 42 and 26 in Fig. 1) together with the valves (marked 30 and 39 in Fig. 1) for controlling the regulatable hydraulic resistances, the potentiometer (marked 2 in Fig. 1) and the electropneumatic converter (marked 4 in Fig. 1).

The controller comprises a main block 50, 50a and 50b which is of substantially U-shape in plan view (see Figs. 2 and 4) and supports on its upper face, by means of pillars 51, a top plate 52. The central portion 50 of the block is formed with a downwardly projecting valve housing 53 (Fig. 3) on the underside of which there is centrally mounted a longitudinally bored support 54 disposed with its axis in the front-to-rear direction, ball bearings 54a being secured in the ends of the bore to carry rotatably a shaft 55 which connects and forms the pivot for front and rear limbs of a rectangular frame 56. This frame constitutes a balancing beam with equal arms. At the left-hand end of the front limb of the frame 56 is secured the lower end of a bellows 57 the upper end of which is secured to the underside of the corresponding portion 50a of the block. A similar bellows 58 is mounted on the opposite end of the front limb of the frame 56 and has its upper end similarly secured to the corresponding portion 50b of the block 50. At the left-hand end of the frame 56, on the rear limb, there is secured the lower end of a bellows 59 having its upper secured to the underside of the block portion 50a. At a similar disposition on the other end of the frame 56 there is secured the lower end of a further bellows 60, the upper end of which is again secured to the underside of the corresponding block portion 50b. The bellows 60 does not appear in Fig. 2 but its location is clearly evident from Fig. 4. The bellows 57 and 58 are of such relative sizes and so spaced from the axis of the shaft 55 that equal pressures within them will produce equal moments about this axis. Similarly equal pressures within the bellows 59 and 60 will also produce equal moments about the axis of the shaft 55.

Figure 4:
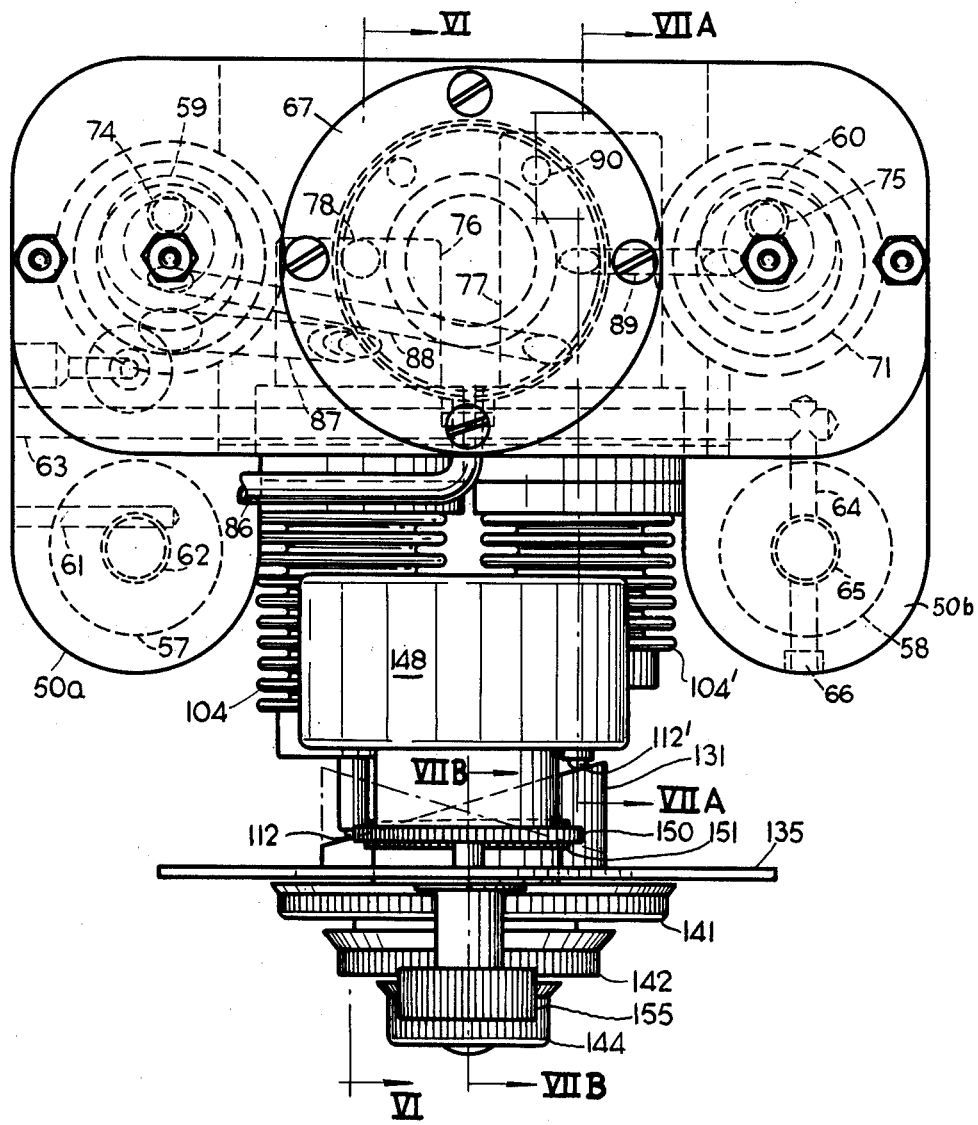
Fig. 4 is a plan view of the apparatus shown in Fig. 2.

Reference to Fig. 4 will show that the bellows 57 may be supplied with a gaseous fluid under pressure through a horizontally extending bore 61 opening, at its outer end, through the left-hand edge of the block portion 50a and intersecting, at its inner end, a cylindrical recess 62 formed from the underside of the portion 50a. Similarly, the bellows 58 may be supplied with a gaseous fluid under pressure by way of a horizontal bore 63 also opening at one end into the same edge of the block portion 50a and communicating at its other end with a bore 64 formed from the front edge of the block portion 50b to intersect a cylindrical recess 65 formed in the underside of the block portion. The outer end of the bore 64 is closed by a plug 66. As will be appreciated from a consideration of Fig. 1, the supplies of pressure fluid introduced into the bores 61 and 63 are derived from an electropneumatic converter. Such a converter is indicated generally at 67 as mounted centrally upon the top plate 52 and preferably is constructed in accordance with the invention forming the subject-matter of co-pending application Serial No. 149,050 filed March 11, 1950, now Patent No. 2,669,247. The pipe connections from the converter to the bores 61, 63 are omitted for the sake of clearness as also are the electrical connections to the converter.

On the upper face of the block 50, 50a, 50b, substantially directly above the bellows 59, is secured the lower end of a capacitance bellows 68 which is subjected to the pressure of a loading spring 69 guided on a bolt 70 secured at its upper end in the top plate 52. At the opposite end of the block there is mounted upon its upper face, substantially directly above the bellows 60, a further capacitance bellows 71 which is similarly loaded by a spring 72 guided on a bolt 73.

The interiors of the bellows 59 and 68, as can be seen from Fig. 4, are in permanent communication with each other by way of a vertical bore 74 formed through the block 50, while the interiors of the bellows 71 and 60 are in permanent communication with each other by way of a vertical bore 75 formed through the block 50. From the front face of the valve housing block portion 53 there are formed two valve-receiving recesses of generally cylindrical form but of different lengths, the shorter one being marked 76 and the longer being marked 77. Within these recesses 76 and 77 there are located logarithmic valves which will be described more fully hereinafter with reference to Figs. 6 and 7. The ports and passages which are controlled by the operation of these valves are indicated in Fig. 4 and comprise a vertical bore 78 which opens, at its lower end, into the inner end of the recess 76 and, at its upper end, into a shallow cylindrical recess 79 formed centrally of the upper face of the block portion 50. Within this recess is secured the lower end of a pressure transfer device which comprises a bellows 80 secured at its open lower end to a ring 81 and closed at its free upper end by a disc 82 having a central re-entrant portion. Surrounding and slightly spaced from the external surface of the bellows 80 is a cylindrical wall 83 which is secured, at its lower edge, in an air-tight fashion to the ring 81 and, at its upper edge, also in an air-tight fashion to the top plate 52. The ring 81 is held in position by a clamp ring 84 and beds upon an elastic sealing ring 85, as shown. When the apparatus is in operation, the space surrounded by the wall 83 and external to the bellows 80 is supplied with a gaseous fluid under pressure by way of a pipe connection 86 (see Figs. 2 and 4), whereas the space within the bellows is filled with a liquid medium. Any liquid which flows through the bore 78 passes through the valve mechanism mounted in the recess 76, at a rate determined by the setting of the valve, and leaves the recess by way of an inclined bore 87, the lower end of which is visible in Fig. 6 and the upper end of which opens through the upper face of the block portion 50a within the boundary of the bellows 68 in order that the liquid, having passed through the recess, may be delivered to the interior of the bellows combination 68, 59. A further inclined bore 88 is formed through the block portions 50a, 50 with its upper end also located within the boundary of the bellows 68 and its lower end opening through the wall of the recess 77. Any liquid which flows through the bore 88 passes through the recess 77, under the control of the valve mechanism housed therein, and emerges therefrom by way of an upwardly inclined passage 89, the upper end of which opens through the upper surface of the block portion 50b within the boundary of the bellows 71 so that liquid supplied through the bore 89 will pass into the internal space of the bellows combination 71, 60. A further vertical bore 90 is formed through the block 50 to establish communication between the interior of the bellows 80 and the rear end of the recess 77.

It will be apparent from a comparison of Fig. 1 with the construction so far described with relation to Figs. 2 to 7, that the bellows 80 corresponds with that marked 26 in Fig. 1, the bellows 57 corresponds with that marked 13 in Fig. 1, the bellows 58 corresponds with that marked 11 in Fig. 1, the bellows 59 and 60 respectively correspond to those marked 34 and 41 in Fig. 1, and that the capacitance bellows 68 and 71 respectively correspond to those marked 35 and 42 in Fig. 1. Moreover, it will be seen from a consideration of the passages formed in the block 50, 53 that these several bellows are interconnected in the manner shown in the diagram.

Figure 6:
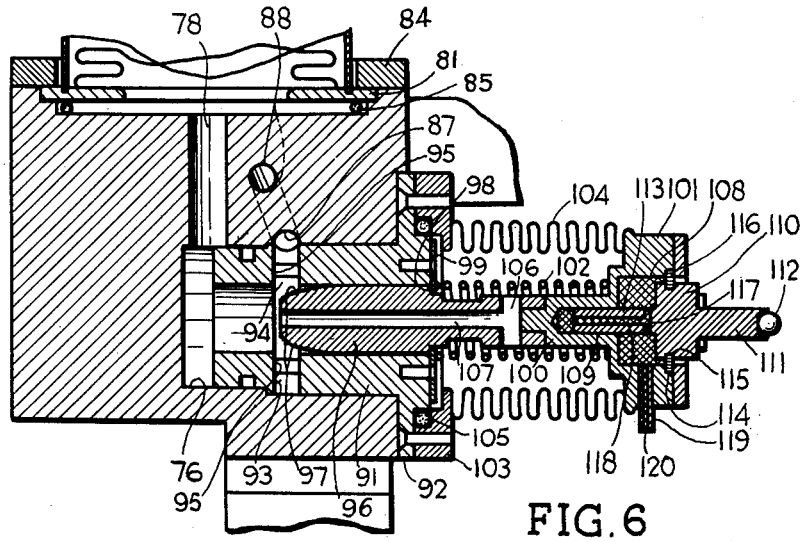
Fig. 6 is a fragmentary section taken on the line VI—VI of Fig. 4.

Within the recess 76 there is disposed a logarithmic valve assembly which will now be described with reference to Fig. 6. The assembly comprises a flanged sleeve 91 which is a close fit within the recess 76 and is secured in position by means of its flange 92. The inner end of the sleeve 91 terminates short of the closed end of the recess 76 so that liquid flowing through the bore 78 may gain access to the interior of the sleeve. At a point spaced somewhat from its inner end, the sleeve is formed with an external annular groove 93 so located that it will register with the end of the bore 87 formed in the part 53. The sleeve is also formed with an internal annular groove 94 at the same axial location as the groove 93 and radial bore 95 are formed through the thinned wall portion thus left in order to establish communication between the internal and external grooves. The movable element of the valve, which is adapted to regulate the free cross-sectional area made available for the flow of liquid from the rear end of the passage through the sleeve 91 into the internal annular groove 94, is constituted by a plug 96 which is a close sliding fit in the front portion of the bore through the sleeve and has its inner end formed, at 97, with controlling surfaces formed in accordance with a logarithmic curve. The plug 96 is shown in Fig. 6 in its outermost position in which the minimum resistance is offered to the flow of liquid to the ports 95, the plug in this position bearing by a shoulder 98 against an annular retaining plate 99 which is secured over the mouth of the bore through the sleeve 91. Outwardly of the shoulder 98 the plug is connected by a spigot and socket joint to a co-axial cylindrical stem 100 carrying an enlarged head 101, a compression spring 102 being disposed around the plug and stem between the inner surface of the head 101 and the outer surface of the plate 99. Between the outer periphery of the inner surface of the head 101 and the inner periphery of a ring 103 which is secured to the flange 92 on the sleeve 91 is arranged a flexible bellows 104 which is secured at its ends in liquid-tight fashion to the respective elements 101 and 103. Between the latter and the flange 92 is interposed a suitable sealing ring 105. The annular space within the bellows 104 is placed in permanent communication with the space at the inner end of the recess 76 by way of a diametral bore 106 and an axial bore 107 formed in the plug 96. It will be understood that the space within the bellows 104 and the bores 106, 107 are normally filled with the liquid medium and that the bellows constitute an effective liquid-tight sealing means for the front end of the valve.

As the adjustment of the valve plug 96 for setting purposes would result in a variation in the volume of the space within the bellows 104 the bores 106, 107 are provided to ensure that the liquid which would thereby be displaced may return to, or be supplied from, the body of liquid contained in the bellows 80. In this way, sudden variations in the pressure in the hydraulic system of the controller are prevented.

In the front or outer face of the head 101 there is formed a cylindrical recess 108 from the base of which a bore 109 is formed axially of the stem 100. A cylindrical floating member 110 is provided with a forwardly-projecting stem 111 in the free end of which is rotatably mounted a ball 112 and with a rearwardly projecting cylindrical stem 113 which is a close sliding fit in the bore 109 formed in the stem 100. The floating member 110, on the other hand, is a relatively loose fit in the cylindrical recess 108 the relative axial lengths of the several parts being such that the member 110 largely projects from the open end of the recess 108 while the inner end of the stem 113 is spaced from the closed end of the bore 109. Around the mouth of the recess 108 is formed an annular groove 114 and at a corresponding location on the member 110 there is formed a complementary groove 115. A ring 116 of a flexible, elastic material such, for example, as rubber, has its inner periphery received as a tight fit in the groove 115 and its outer periphery received as a tight fit in the groove 114. The free annular space thus sealed off from the external atmosphere, and comprised between the wall of the recess 108 and the stem 113, is placed in communication with the free space behind the end of the stem 113 by way of diametral and axial bores 117 and 118 respectively formed in the stem 113. Through the wall of the head 101 there is formed a bore to receive a small tube 119, the end of which projects somewhat from the head. By means of this tube the spaces within the head are evacuated and then filled with a suitable liquid, for example, the same liquid as is employed in the hydraulic system of the controller. The outer end of the tube 119 is then sealed as is indicated at 120. Due to the arrangement described, a rise in temperature will cause a corresponding expansion of the body of liquid contained within the head with an appropriate displacement of the member 110 outwards relative to the head 101. In consequence, the effective overall length of the movable element of the valve will be slightly increased so that if the ball at the free end of the stem 111 has been set and held in an adjusted position, the plug 96 will be forced a short distance farther inwards in the bore through the sleeve 91 with an appropriate slight reduction in the free cross-sectional area for the flow of liquid from the bore of the sleeve into the ports 95. It will be seen that the slight reduction in the viscosity of the liquid which follows a rise in temperature will thus be compensated. The arrangement at the head of the valve plug therefore constitutes an effective temperature compensator.

Figure 7:
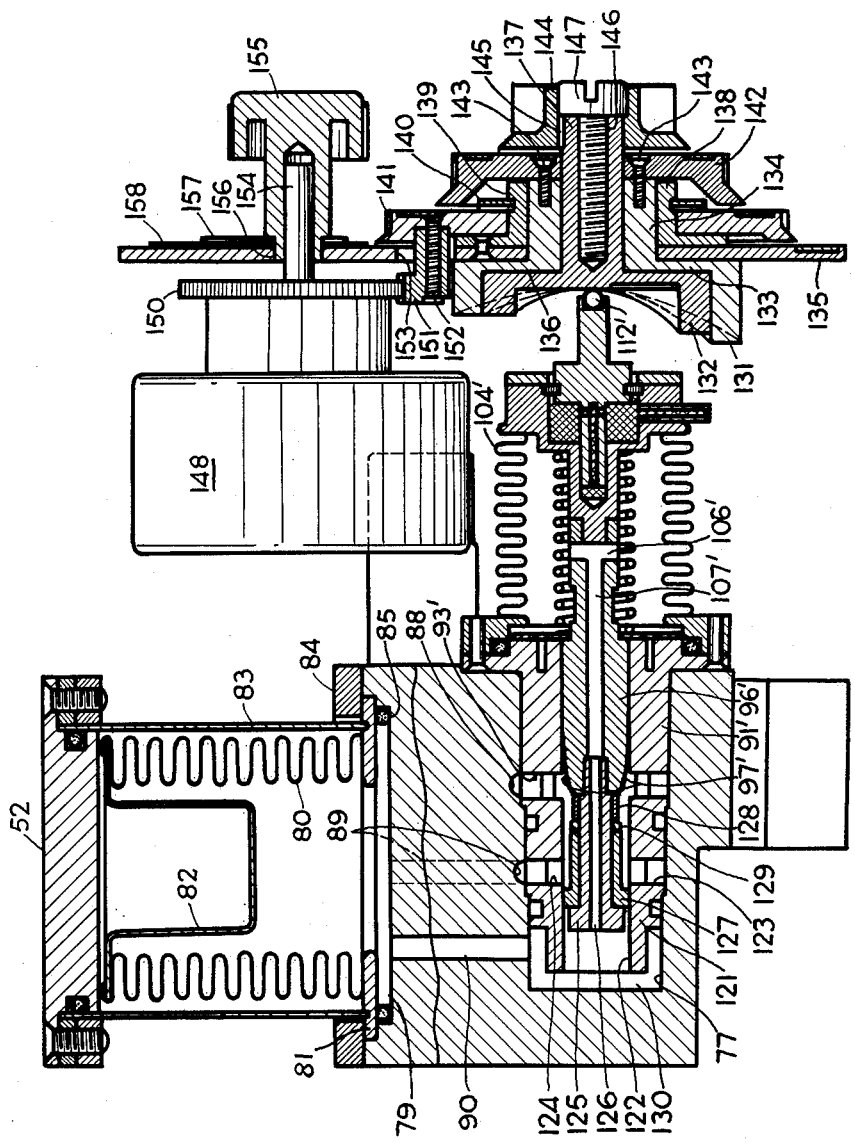
Fig. 7 is a sectional elevation taken partly on the line VIIA—VIIA of Fig. 4, and partly on the line VIIB—VIIB of Fig. 4, the adjusting cams being shown in another position corresponding to that indicated in chain-dotted lines in Fig. 4.

Referring now to Fig. 7, it will be seen that the valve assembly mounted in the recess 77 has many points of similarity to that shown in Fig. 6, particularly so far as the plug with the temperature compensating and liquid sealing devices are concerned and corresponding parts in the two figures are therefore indicated by corresponding reference numerals with the addition of an index to those which apply to the valve shown in Fig. 7.

The points of difference will now be referred to and it will be seen that the sleeve 91' has been extended at 121 to provide a cylindrical bore 122. Between the end of the sleeve proper 91' and the extension piece 121, there is formed an annular groove 123 which is placed in communication with the interior of the sleeve by way of radial ports 124. Secured in a counterbore in the free inner end of the plug 96' is a headed stud 125 formed with an axial bore 126 and serving to hold in place an annular piston 127 which is a close sliding fit in the core 122. 128 indicates a spacer collar and 129 a packing or sealing ring.

The external annular groove 93' formed in the sleeve 91' is arranged to register with the lower end of the bore 88 formed in the block 50, 53. Consequently, fluid is supplied from the bellows combination 59, 68 to the interior of the sleeve 91' under the control of the logarithmically-shaped surfaces 97' on the plug 96'. The liquid which thus flows through the annular space between the internal surface of the sleeve and the external surface of the skirt portion of the piston 127 flows out through the radial ports 124 and the external annular groove 123 into the inclined bore 89 through which it gains access to the interior of the bellows combination 60, 71.

As before, the space within the bellows 104′ is filled with the hydraulic medium but in this case as the interior of the sleeve 91′ must be maintained isolated from the interior of the bellows 80, any liquid which is displaced from the interior of the bellows 104′ will flow through the bores 106′, 107′ and 126 to the portion of the bore 122 in the sleeve extension 121 which is beyond the piston 127. The rear end of the bore 122 is in free communication with a clearance space 130 surrounding the extremity of the extension 121 and in permanent communication with the space within the bellows 80 by way of the vertical passage 90 which has already been referred to. In this way, any displacement of liquid from the bellows 104′ which may be occasioned by making a change in the setting of the valve plug 96′ will be prevented from causing a disturbance in the pressure conditions within the bellows arrangements 59, 68 and 60, 71 of the controller. It will be understood that the temperature compensating arrangement will function in the same manner as in the case of the valve already described with reference to Fig. 6.

The control adjustment of the plug members 96, 96′ of the two valve arrangements is effected in the example illustrated by means of face cams. There are two such cams marked 131 and 132, the outer cam 131 being formed on the periphery of a disc 133 which carries a forwardly-projecting tubular portion 134 that is rotatably received as a close fit in an aperture in a panel 135. The inner cam 132 is also formed on the periphery of a disc shown at 136 and this disc carries a forwardly-projecting spindle 137 which is a close rotary fit in the passage through the tubular portion 134 but extends somewhat beyond the front end thereof. Around the opening in the panel 135 there is secured a bushing 138 to give greater guidance to the tubular portion 134 and formed with an external annular groove 139 into which may be clipped a spring-retaining ring 140 in order to prevent the return over the free end of the bush 138 of a dial 141 which is rotatably mounted on the inner end of the bush.

A second and somewhat smaller dial 142 is secured by means of screws 143 upon the outer end of the tubular portion 134 formed in one piece with the cam 131. In addition, an actuating knob 144 is secured upon the outer or forwardly-projecting end of the spindle 137 by means of a key 145. It will be seen that normally the dial 141 is rotatably relative to the dial 142 and knob 144 and that the latter is in turn rotatably relative to the dial 142. In order, as is desired, during the functioning of the apparatus, to be able to adjust both valves simultaneously, means is provided whereby the knob 144 may be clamped to the dial 142. This means comprises a screw axial bore 146 formed from the free end of the spindle 137 and a clamping screw 147 engaged in the threaded bore. By tightening the clamping screw 147, the knob 144 and the cam disc 136 are drawn tightly together to be clamped against the corresponding faces of the dial 142 and the cam disc 133. Should the knob 144 be adjusted with the parts in this condition, the dial 142 will rotate therewith and the two cams 131 and 132 will rotate in unison.

The cam and dial assembly is located with its common axis disposed substantially midway between the axes of the two valve assemblies and so that the ball 112 will be contacted by the operative face of the inner cam 132 while the ball 112′ will be contacted by the operative face of the outer cam 131.

Directly above the cam assembly just described is mounted the potentiometer which corresponds to that shown at 2 in Fig. 1. This potentiometer comprises the usual winding co-operating with a wiper arm and disposed within a stepped cylindrical casing 148 which is supported on its bearer members 149 which project forwardly from the front face of the block 50. The arrangement is such that the casing 148 may be rotated bodily upon its bearer members. At the front end of the neck portion of the casing 148, there is secured a toothed gear-wheel 150, the teeth of which are in mesh with those on a toothed quadrant 151 which is secured as by screws 152 to the rear face of the dial 141, it passing through an elongated arcuate slot 153 formed in the panel 135 seeing that the gear-wheel 150 is located at the rear of the panel and the dial 141 is located in front thereof. The spindle 154 which is adapted to operate the wiper of the potentiometer extends into and is secured to an operating knob 155 disposed in front of the panel 135 and rotatably engaged by its inner end in an aperture 156 in the latter. This knob has secured thereon an index or pointer 157 which co-operates with a calibrated scale 158 mounted on the front face of the panel 135.

Figure 5:
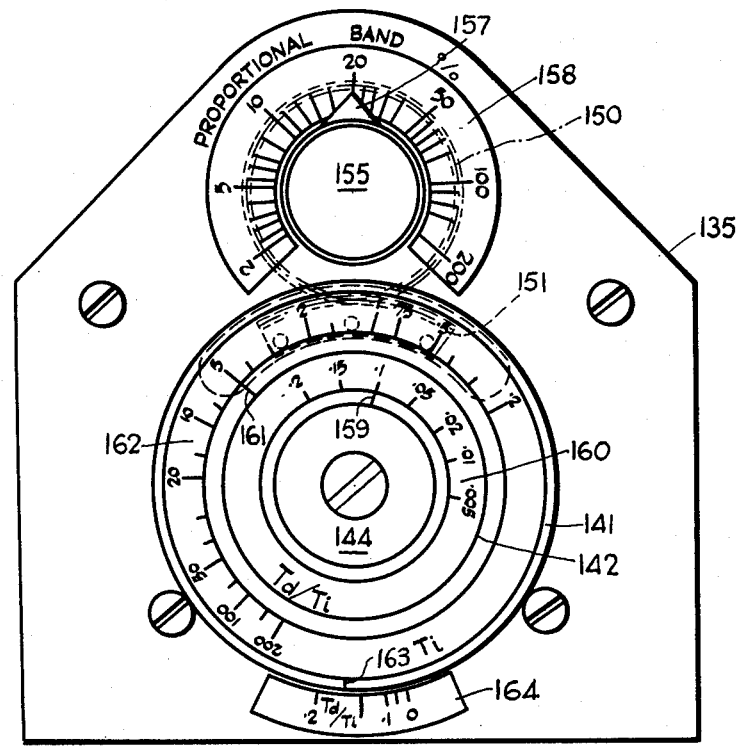
Fig. 5 is a front elevation of the setting dials of the apparatus.

Referring now to Figs. 2 and 5, it will be seen that the scale 158 is graduated from .2 to 200 and marked "Proportional Band Percent." Furthermore, it will be apparent from the nature of the markings on the scale that the potentiometer winding is such as to give a logarithmic relationship between the adjustments of the pointer 157 and the changes in the ratio between the input signal (referring to Fig. 1) and the signal actually fed to the electropneumatic converter 67.

It will also be seen that the knob 144 carries an index 159 which is adapted to co-operate with a scale 160 carried on the front face of the dial 142. This scale is graduated from 0.2 to 0.005 and bears the indication "$T_d/T_i$". On the periphery of the dial 142 there is an index 161 which is adapted to co-operate with a scale 162 applied to the front face of the dial 141. This scale is graduated from 200 to 0.2 and carries the indication "$T_1$."

There is also carried on the periphery of the dial 141 an index 163 which is adapted to co-operate with a short quadrant scale 164 applied to the front face of the panel 135 just beneath the lower portion of the dial 141. This scale is graduated from 0.2 to zero and bears the indication "$T_d T_i$."

It will be clear from a consideration of Fig. 5 that all the scales are of the logarithmic character.

The potentiometer within the case 148 constitutes the means for attenuating or amplifying the incoming signal and, as has been stated, is logarithmically arranged, that is if the control knob 155 is rotated by a predetermined angular amount the degree of attenuation before and after the change in setting will always bear the same ratio, this attenuation being a measure of the proportional band K.

The plugs 96 and 96′ of the valves for setting the time constants $T_1$ and $T_2$, respectively, are displaced by rotating the two face cams 132 and 131, respectively, the same change in the position of the valves creating the same resistance ratios for both valves. If the knob 144 and the dial 142 are coupled in a certain relative position to each other by means of the clamping screw 147, both plugs 96 and 96′ will be displaced simultaneously by rotation of the knob and dial to produce the same ratio change in $T_1$ and $T_2$ and consequently the ratio $$\frac{T_1}{T_2}$$

remains constant, so that according to Equation 1, $n$ also remains constant.

If the knob 144 and dial 142 are uncoupled and the one is moved relative to the other, the ratio of $T_1$ to $T_2$ and hence the value of $n$ change, the extent of the change being determined by the displacement of the knob 144 relative to the dial 142. The consequent adjustment of the index 159 relative to the scale 160 enables the direct reading of the value of $n$ (or $T_d/T_i$) which is one of the control characteristics.

The dial 142 for altering the setting of the plug 96' of the valve which determines the auxiliary time T₂ carries the index 161 which works in close association with the scale 162 carried on the dial 141 which is conveniently calibrated in time units, for example minutes, and a certain setting of which, to bring the index 163 opposite the graduation 0 on the scale 164, corresponds to the condition, derivative time equals zero. For this setting of the dial 141 the integral time T₁ is indicated directly on the dial 141 by the index 161.

Should the derivative time and therefore the value of $n$ not be zero and the dial 141 remain in the same position as before, the reading on the dial 141 would indicate T₂ and would have to be divided by $\phi$ $(n)$ in order to obtain T₁. Provision has, however, been made for obtaining a direct reading of T₁, the dial 141 being rotated by an amount corresponding to the value of $\phi$ $(n)$ as indicated by the co-operation of the index 163 on the dial 141 with the fixed scale 164 which carries values of $(n)$.

In order to alter the proportional band, the potentiometer with a logarithmic characteristic (which is contained in the case 148) is set by knob 155, index 157 reading against the fixed scale 158. Compensation for $\phi$ $(n)$ is effected by rotating the case 148, this being automatically effected, by means of the gearing 150, 151, when the dial 141 is adjusted.

The procedure is setting the controller to the characteristic values K, T₁ and $(n)$ is as follows:

The valve controlling elements 144 and 142 are uncoupled and the knob 144 for adjusting the value of T₁ is set in relation to the dial 142 for controlling the valve for adjusting the value of T₂, the adjustment of the knob in relation to the dial being effected in accordance with the desired value of $(n)$. Thereupon the knob 144 and dial 142 are coupled together and the dial 141 is set in relation to the fixed scale 164 in order to select the required value of $(n)$. Thereafter the knob 144 and dial 142 are adjusted together so that the required integral time T₁ is indicated on the scale 162 on the dial 141. Finally, the proportional band value K is set by adjusting the index 157 on the attenuation setting means in relation to the scale 158.

Temperature compensation is achieved according to this invention in the following manner.

The rotary motion of the setting knob and dial of the valves for controlling the settings T₁ and T₂ are converted by the face cam mechanism into a proportionate linear motion of the plugs 96 and 96'. Between the plug member proper (96 or 96') and the ball (112 or 112') moved linearly by the face cam mechanism, is interposed the body of liquid contained in the recess (108 or 108') in the head (101 or 101'), this liquid expanding with rise in temperature.

The liquid is so chosen that for a given temperature change, it will alter the linear adjustment of the respective plug 96 or 96' to the same extent as the viscosity of the hydraulic liquid in the controller will have been altered by the same change in temperature.

Figure 8:
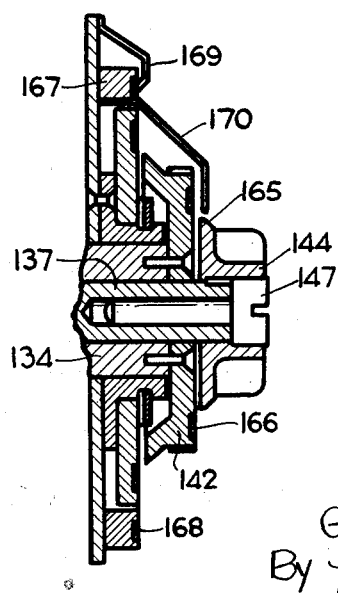
Fig. 8 is a fragmentary sectional elevation illustrating a modified arrangement of the dials employed to set the position of the cams.

Fig. 8 illustrates an alternative arrangement of dials. The knob 144 here carries a scale 165 instead of the index 159 of Fig. 5, and co-operates with an index 166 on the dial 142 (instead of a scale 160) this reading giving again the integral time T₁. If the value of the derivative time T_d is required to be read directly, an additional index ring 167 is provided having a scale 168 calibrated in values of $(n)$ and co-operating with a fixed index 169 while itself carrying a further index 170 against which T_d can be read on the scale 165 secured to the knob 144.

Other arrangements of dials are possible, based on the construction of the valves to open according to a logarithmic law, and on the functional relationships $f$ and $\phi$.

Logarithmic valve motions can be obtained either by appropriately forming the orifices of the valves, or by utilising valves having orifices or normal configuration, i. e., cylindrical, conical, or the like, with means interposed in the actuating mechanism for introducing a logarithmic correction.

What I claim is:

1. In a three-term pneumatic controller of the type described, a first fluid resistance, a second fluid resistance, a potentiometer resistance, first means for varying the first fluid resistance, logarithmally, second means for varying the second fluid resistance logarithmally, third means for coupling said first and second means for maintaining the ratio of said first and second resistances at a selected value, fourth means for varying the potentiometer resistance logarithmally, and fifth means for further varying said potentiometer resistance by a value which is a function of said selected value of said ratio.

2. In a three-term pneumatic controller of the type described, a first fluid resistance, a second fluid resistance, a further resistance comprising a potentiometer coil rotatably mounted on said controller, a rotary wiper arm for said coil, the logarithm of resistance of said further resistance varying directly in proportion to the angular turning movement of said wiper arm and said coil relative to each other, first means for varying the first fluid resistance logarithmally, second means for varying the second fluid resistance logarithmally, third means for coupling said first and second means for maintaining the ratio of said first and second resistances at a selected value, for angularly turning said coil relative to said wiper arm for varying said further resistance in accordance with the selected value of said ratio, and fifth means for angularly turning said wiper arm relative to said coil for further varying said further resistance.

3. In a three-term pneumatic controller of the type described, a first fluid resistance, a second fluid resistance, a further resistance comprising a potentiometer coil rotatably mounted on said controller, a rotary wiper arm for said coil, the logarithm of resistance of said further resistance varying directly in proportion to the angular turning movement of said wiper arm and said coil relative to each other, first means for varying the first fluid resistance logarithmally, second means for varying the second fluid resistance logarithmally, third means for coupling said first and second means for maintaining the ratio of said first and second resistances constant at a selected value and fourth means for angularly turning said coil relative to said wiper arm for varying said further resistance in accordance with said selected value of said ratio.

4. In a three-term pneumatic controller of the type described, a first fluid resistance, a second fluid resistance, a further resistance comprising a potentiometer coil having a housing rotatably mounted on said controller, a first element mounted on said controller so as to be longitudinally movable and positioned and operative with respect to said first fluid resistance for varying the resistance thereof by movement of said first element, a second element mounted on said controller so as to be longitudinally movable and positioned and operative with respect to said second fluid resistance for varying the resistance thereof by movement of said second movable element, a longitudinal sleeve rotatably mounted on said controller, a shaft extending turnably through the opening of said sleeve, cam means coupling said shaft to said first element for producing movement thereof by turning of said shaft, the logarithm of said resistance of said first fluid resistance varying directly in proportion to the angular turning movement of said shaft, further cam means coupling said sleeve to said second element for producing movement thereof by turning of said sleeve, the logarithm of resistance of said second fluid resistance varying directly in proportion to the angular movement of said sleeve, means for coupling said shaft and said sleeve for maintaining the ratio of said first and second resistances constant at a selected value, a further shaft rotatably mounted on said controller, a potentiometer wiper arm coupled to said further shaft and positioned and operative with respect to said coil for varying the resistance thereof by rotary movement of said further shaft, the logarithm of the resistance of said further resistance varying directly in proportion to the angular movement of said further shaft relative to said coil, and means for rotating said housing for varying said further resistance in accordance with the selected value of said ratio.

5. A controller in accordance with claim 4, wherein said means for rotating said housing comprises an annular disc mounted coaxially with respect to said first-mentioned shaft and drive means coupling said disc and said housing so as to be adapted to drive said housing in a direction of rotation which is opposite to the direction of rotation of said disc.

6. A controller in accordance with claim 4, said first and second elements being respectively located rearwardly of said sleeve and said first-mentioned shaft, said first and second elements being laterally spaced, said first-mentioned shaft and said sleeve being located laterally between said first and second movable elements, said further cam means comprising an annular cam-supporting disc mounted on the rear end of said sleeve and concentric therewith, an outer face cam mounted on the rear face of said cam-supporting disc adjacent the outer periphery thereof, and a ball bearing rotatably carried by the front end of said second movable element in operative contact with said outer face cam, said first-mentioned cam means comprising a further cam-supporting disc mounted on the rear end of said first-mentioned shaft rearwardly of said annular cam-supporting disc, an inner face cam mounted on the rear face of said further cam-supporting disc adjacent the outer periphery thereof and inwardly of said inner face cam, and a further ball bearing rotatably carried by the front end of said first movable element in operative contact with said inner face cam.

7. A controller in accordance with claim 6, wherein said means for rotating said housing comprises an annular disc mounted coaxially with respect to said first-mentioned shaft and drive means coupling said disc and said housing so as to be adapted to drive said housing in a direction of rotation which is opposite to the direction of rotation of said disc.

8. Pneumatic control apparatus of the character which when supplied with an incoming signal proportional to the extent to which the value of a variable has departed from a required value will yield a pneumatic outgoing signal composed of three components respectively proportional to the magnitude, the time derivative and the time integral of the incoming signal, said apparatus comprising a first fluid resistance, a second fluid resistance, a potentiometer resistance, first means for varying the first fluid resistance logarithmically, second means for varying the second fluid resistance logarithmically, third means for coupling said first and second means for simultaneously varying said first and second resistances whilst maintaining the ratio of the first and second resistances constant at a selected value which is a function of the ratio of said time derivative and said time integral, fourth means for varying the potentiometer resistance logarithmically in accordance with the selected value of said ratio, and fifth means for further varying the potentiometer resistance to select the proportionality of said incoming signal to the extent to which the value of said variable has departed from said required value.

References Cited in the file of this patent

UNITED STATES PATENTS

| 1,678,459 | Bowland | July 24, 1928 |
| 2,125,081 | Moore | July 26, 1938 |
| 2,266,871 | Krogh | Dec. 23, 1941 |
| 2,285,540 | Stein | June 9, 1942 |
| 2,325,967 | Moore | Aug. 3, 1943 |
| 2,360,889 | Philbrick | Oct. 24, 1944 |
| 2,372,345 | Temple | Mar. 27, 1945 |
| 2,374,336 | D'Arcey | Apr. 24, 1945 |
| 2,507,606 | McLeod | May 16, 1950 |
| 2,698,023 | Eckman | Dec. 28, 1954 |